United States Patent
Schroedle et al.

(10) Patent No.: US 9,865,865 B2
(45) Date of Patent: Jan. 9, 2018

(54) METHOD FOR PRODUCING CATHODES

(71) Applicant: BASF SE, Ludwigshafen (DE)

(72) Inventors: Simon Schroedle, Iselin, NJ (US);
Martin Schulz-Dobrick, Mannheim (DE)

(73) Assignee: BASF SE, Ludwigshafen (DE)

( * ) Notice: Subject to any disclaimer, the term of this patent is extended or adjusted under 35 U.S.C. 154(b) by 153 days.

(21) Appl. No.: 14/437,553

(22) PCT Filed: Oct. 11, 2013

(86) PCT No.: PCT/EP2013/071286
§ 371 (c)(1),
(2) Date: Apr. 22, 2015

(87) PCT Pub. No.: WO2014/063934
PCT Pub. Date: May 1, 2014

(65) Prior Publication Data
US 2015/0280206 A1    Oct. 1, 2015

(30) Foreign Application Priority Data

Oct. 23, 2012  (EP) .................................... 12189539

(51) Int. Cl.
| H01M 4/04 | (2006.01) |
| H01M 4/1391 | (2010.01) |
| H01M 10/0525 | (2010.01) |
| H01M 4/505 | (2010.01) |
| H01M 4/525 | (2010.01) |

(52) U.S. Cl.
CPC ........... *H01M 4/04* (2013.01); *H01M 4/0402* (2013.01); *H01M 4/043* (2013.01); *H01M 4/0404* (2013.01); *H01M 4/0435* (2013.01); *H01M 4/0471* (2013.01); *H01M 4/1391* (2013.01); *H01M 10/0525* (2013.01); *H01M 4/505* (2013.01); *H01M 4/525* (2013.01); *Y10T 29/301* (2015.01); *Y10T 29/49108* (2015.01)

(58) Field of Classification Search
CPC ...... H01M 4/04; H01M 4/043; H01M 4/0402; H01M 2004/027; H01M 2004/028; H01M 4/0404; H01M 4/0435; H01M 4/0471; H01M 4/1391; H01M 4/505; H01M 4/525; H01M 10/0515; Y10T 29/301; Y10T 29/49108
See application file for complete search history.

(56) References Cited

U.S. PATENT DOCUMENTS

| 5,770,018 A * | 6/1998 | Saidi ................. C01G 45/1242 204/157.15 |
| 2004/0091773 A1 | 5/2004 | Boczer et al. |
| 2006/0216597 A1 | 9/2006 | Boczer et al. |
| 2008/0241703 A1 | 10/2008 | Yamamoto et al. |
| 2009/0199394 A1 | 8/2009 | Boczer et al. |
| 2010/0236056 A1 | 9/2010 | Boczer et al. |
| 2011/0053003 A1 | 3/2011 | Deguchi |
| 2011/0111302 A1 | 5/2011 | Sato et al. |
| 2011/0143199 A1 | 6/2011 | Muraoka et al. |
| 2011/0254509 A1 | 10/2011 | Boczer et al. |

FOREIGN PATENT DOCUMENTS

| JP | 7045270 A | * 2/1995 |
| JP | 2003-297337 | 10/2003 |
| JP | 2003346896 A | * 12/2003 |
| JP | 2004-010988 | 1/2004 |
| JP | 2004-356004 | 12/2004 |
| JP | 2007-103040 | 4/2007 |
| JP | 2007-273259 | 10/2007 |
| JP | 2010-199022 | 9/2010 |
| JP | 2011-238476 A | 11/2011 |
| WO | WO 2004/045008 A2 | 5/2004 |

OTHER PUBLICATIONS

International Search Report dated Jan. 21, 2014 in PCT/EP2013/071286.
Office Action dated Sep. 5, 2017 for Japanese Application No. 2015-538366 with translation.

* cited by examiner

*Primary Examiner* — Carl Arbes
(74) *Attorney, Agent, or Firm* — Oblon, McClelland, Maier & Neustadt, L.L.P.

(57) ABSTRACT

Process for producing cathodes
Process for producing cathodes comprising a cathode material comprising
  (A) at least one lithiated transition metal mixed oxide,
  (B) carbon in an electrically conductive modification,
  (C) at least one binder,
and also
  (D) at least one film,
wherein
  (a) a mixture comprising lithiated transition metal mixed oxide (A), carbon (B) and binder (C) is applied to film (D),
  (b) dried,
  (c) compacted to such an extent that the cathode material has a density of at least 1.8 g/cm$^3$ to obtain a compacted blank and
  (d) after compaction as per (c) thermally treated at a temperature in the range from 35° C. below the melting point or the softening point of binder (C) to a maximum of 5° C. below the melting point or the softening point of binder (C).

12 Claims, 1 Drawing Sheet

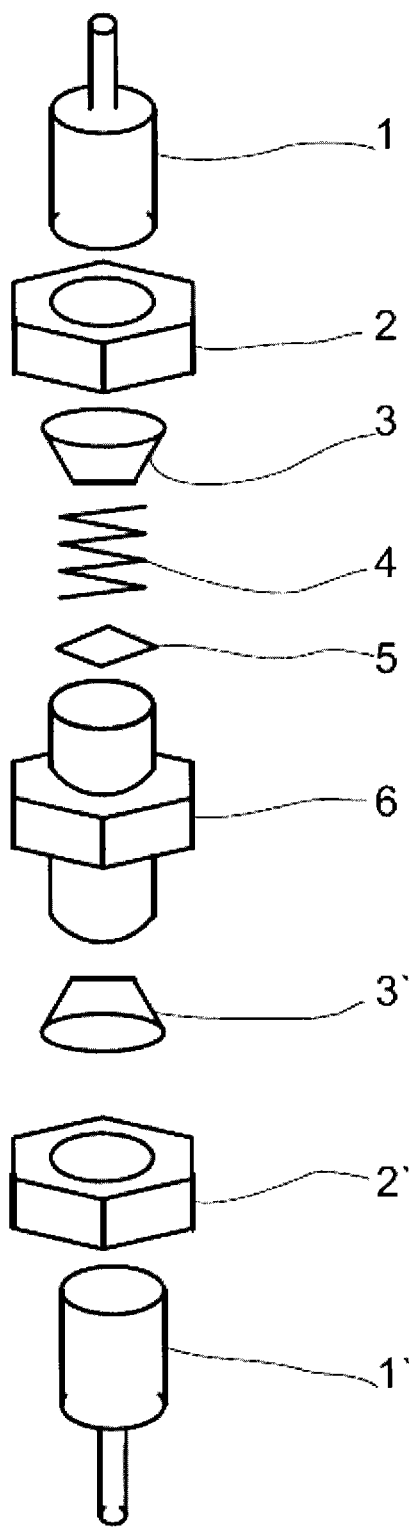

METHOD FOR PRODUCING CATHODES

METHOD FOR PRODUCING CATHODES

The present invention relates to a process for producing cathodes comprising a cathode material comprising
(A) at least one lithiated transition metal mixed oxide,
(B) carbon in an electrically conductive modification,
(C) at least one binder,
and also
(D) at least one film,
wherein
(a) a mixture comprising lithiated transition metal mixed oxide (A), carbon (B) and binder (C) is applied to film (D),
(b) dried,
(c) compacted to such an extent that the cathode material has a density of at least 1.8 g/cm³ to obtain a compacted blank and
(d) after compaction as per (c) thermally treated at a temperature in the range from 35° C. below the melting point of binder (C) to a maximum of 5° C. below the melting point of binder (C).

Lithium ion batteries have recently attracted attention in many fields of application. However, the batteries have to meet demanding quality requirements. Various constituents of the battery can be altered in order to improve it, for example anodes, cathodes, electrolytes or power outlet leads. Particular attention is generally paid to the electrodes and in particular the cathodes.

Apart from the chemical composition of the cathode material, utilization of the theoretically achievable capacity is an important factor in the selection of a suitable cathode material. It has been observed that this is frequently not achieved in batteries which are optimized in terms of energy density, for example in terms of a high electrode loading in g of active material/m². In addition, the power load capability is frequently not optimal.

It was therefore an object of the invention to provide cathodes which have a particularly high capacity and power load capability. A further object was to provide a process for producing cathodes having a particularly high capacity, in particular with a high electrode loading in g of active material/m², and a high power load capability.

We have accordingly found the process defined at the outset, also referred to as process of the invention for short.

It has been found that not only is the choice of a cathode material having a high capacity important, but it is also important to process the cathode material to give cathodes which have a favorable/high power load capability, even at a high capacity per unit area or electrode loading, measured in A·h/m² or g/m².

To carry out the process of the invention, the following starting materials are used:
(A) at least one lithiated transition metal mixed oxide, also referred to as mixed oxide (A) for short,
(B) carbon in an electrically conductive modification, also referred to as carbon (B) for short,
(C) at least one binder, also referred to as binder (C) for short, and also
(D) at least one film, also referred to as film (D) for short.

Mixed oxide (A), carbon (B), binder (C) and film (D) will be defined in more detail below.

Mixed oxide (A) can be selected from among lithiated (lithium-comprising) transition metal mixed oxides having a sheet structure, lithiated transition metal mixed oxides having a spinel structure and lithiated transition metal phosphates having an olivine structure, for example LiFePO₄ and LiMn$_{1-h}$Fe$_h$PO₄
(where 0≤h≤0.55), in particular LiMnPO₄.

In an embodiment of the present invention, mixed oxide (A) is selected from among lithiated manganese-comprising transition metal mixed oxides, preferably from among those which have an Mn content of at least 35 mol %, based on total transition metal, particularly preferably at least 50 mol %.

In an embodiment of the present invention, mixed oxide (A) is selected from among lithiated manganese-comprising transition metal mixed oxides which have an Mn content of up to 80 mol %, based on total transition metal, for example those having a sheet structure or spinel structure, particularly preferably from among lithiated transition metal mixed oxides having a sheet structure and an Mn content of up to 70 mol %.

For the purposes of the present invention, "content of transition metal" is the content of transition metal ions, the content of manganese or manganese content is in each case the content of manganese ions. Analogous apply in the case of other transition metals and in the case of lithium.

In a preferred embodiment of the present invention, mixed oxide (A) is selected from among lithiated Mn-comprising spinels which have a nickel content of up to 25 mol %, based on total transition metal, particularly preferably from among lithiated Mn-comprising spinels which have a nickel content of from 20 to 25 mol %.

In a preferred embodiment of the present invention, mixed oxide (A) is selected from among lithiated mixed oxides which have a sheet structure and comprise manganese and at least one further transition metal selected from among cobalt and nickel. In a preferred embodiment of the present invention, mixed oxide (A) is very particularly preferably selected from among lithiated mixed oxides which have a sheet structure and comprise manganese, cobalt and nickel and may be doped or undoped.

Suitable mixed oxides having a sheet structure are LiMnO₂ and in particular those of the general formula (I)

where y is from zero to 0.3, preferably from 0.05 to 0.2,
c is in the range from 0.35 to 0.8, preferably from 0.45 to 0.7, particularly preferably from 0.5 to 0.68,
a is in the range from 0.1 to 0.5 and
b is in the range from zero to 0.5 and is preferably smaller than a, particularly preferably up to 0.3 and smaller than a and very particularly preferably from 0.1 to 0.25 and smaller than a,
and:

$$a+b+c=1$$

Suitable mixed oxides having a spinel structure are, in particular, those of the general formula (II)

where the variables are defined as follows:
d is in the range from zero to 0.4,
t is in the range from zero to 0.4,
where more than 35 mol % of M is manganese, preferably more than 50 mol %. Further elements M from among which a maximum of 65 mol % is selected are one or more metals of groups 3 to 12 of the Periodic Table of the Elements, for example Ti, V, Cr, Fe, Co, Ni, Zn, Mo, with preference being given to Co and Ni and in particular Ni.

Mixed oxide (A) is preferably present in the form of particles. These particles can, for example, be in the form of agglomerates of primary particles. The primary particles can have, for example, an average diameter (D50) in the range from 10 nm to 1 µm, in particular from 100 to 500 nm. The agglomerates can, for example, have an average diameter in the range from 1 µm to 30 µm, with preference being given to from 2 to 20 µm.

Carbon (B) is preferably selected from among carbon black, graphite, graphenes and carbon nanotubes.

Examples of graphite are not only mineral and synthetic graphite but also expanded graphites and intercalated graphite.

Carbon black can, for example, be selected from among lamp black, oven black, flame black, thermal black, acetylene black, industrial black and furnace black. Carbon black can comprise impurities, for example hydrocarbons, in particular aromatic hydrocarbons, or oxygen-comprising compounds or oxygen-comprising groups such as OH groups. Furthermore, sulfur- or iron-comprising impurities are possible in carbon black. In a further variant, modified carbon blacks or modified graphites, for example carbon blacks or graphites which have hydroxyl groups, epoxy groups, keto groups or carboxyl groups, are used.

Carbon black can, for example, have an average particle diameter (D50) of the primary particles in the range from 10 to 300 nm, preferably from 30 to 100 nm.

In an embodiment of the present invention, carbon black can be used in the form of agglomerates whose diameter (D50) preferably does not exceed 100 µm, particularly preferably 10 µm. In an embodiment, carbon black which is in the form of agglomerates, where the proportion of agglomerates having a diameter greater than 100 µm is less than 1% by weight, determined by, for example, sieve analysis, is selected.

In an embodiment of the present invention, the electrically conductive, carbon-comprising material is carbon nanotubes. Carbon nanotubes (CNT for short), for example single-walled carbon nanotubes (SW CNT) and preferably multi-walled carbon nanotubes (MW CNT), are known per se. A process for the production thereof and some properties are described, for example, by A. Jess et at in *Chemie Ingenieur Technik* 2006, 78, 94-100.

In an embodiment of the present invention, carbon nanotubes have a diameter in the range from 0.4 to 50 nm, preferably from 1 to 25 nm.

In an embodiment of the present invention, carbon nanotubes have a length in the range from 10 nm to 1 mm, preferably from 100 nm to 500 nm.

For the purposes of the present invention, the term graphene refers to virtually ideally or ideally two-dimensional hexagonal carbon crystals which have a structure analogous to single graphite layers.

Binders (C) are selected from among organic (co)polymers. Suitable (co)polymers, i.e. homopolymers or copolymers, can be selected, for example, from among (co)polymers which can be obtained by anionic, catalytic or free-radical (co)polymerization, in particular from among polyethylene, polyacrylonitrile, polybutadiene, polystyrene and copolymers of at least two comonomers selected from among ethylene, propylene, styrene, (meth)acrylonitrile and 1,3-butadiene. Polypropylene is also suitable. Further suitable polymers are polyisoprene and polyacrylates. Particular preference is given to polyacrylonitrile and also halogenated (co)polymers, in particular fluorinated (co)polymers.

For the purposes of the present invention, the term polyacrylonitrile encompasses not only polyacrylonitrile homopolymers but also copolymers of acrylonitrile with 1,3-butadiene or styrene. Preference is given to polyacrylonitrile homopolymers.

For the purposes of the present invention, the term polyethylene encompasses not only homopolyethylene but also copolymers of ethylene which comprise at least 50 mol % of ethylene in copolymerized form and up to 50 mol % of at least one further comonomer, for example α-olefins such as propylene, butylene (1-butene), 1-hexene, 1-octene, 1-decene, 1-dodecene, 1-pentene, also isobutene, vinylaromatics such as styrene, also (meth)acrylic acid, vinyl acetate, vinyl propionate, $C_1$-$C_{10}$-alkyl esters of (meth)acrylic acid, in particular methyl acrylate, methyl methacrylate, ethyl acrylate, ethyl methacrylate, n-butyl acrylate, 2-ethylhexyl acrylate, n-butyl methacrylate, 2-ethylhexyl methacrylate, also maleic acid, maleic anhydride and itaconic anhydride. Polyethylene can be HDPE or LDPE.

For the purposes of the present invention, the term polypropylene encompasses not only homopolypropylene but also copolymers of propylene which comprise at least 50 mol % of propylene in copolymerized form and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

For the purposes of the present invention, the term polystyrene encompasses not only homopolymers of styrene but also copolymers with acrylonitrile, 1,3-butadiene, (meth)acrylic acid, $C_1$-$C_{10}$-alkyl esters of (meth)acrylic acid, divinylbenzene, in particular 1,3-divinylbenzene, 1,2-diphenylethylene and α-methylstyrene.

Another preferred binder (C) is polybutadiene.

Other suitable binders (C) are selected from among polyethylene oxide (PEO), cellulose, carboxymethylcellulose, polyimides and polyvinyl alcohol.

Binders (C) can be crosslinked or uncrosslinked organic (co)polymers.

In a particularly preferred embodiment of the present invention, binders (C) are selected from among halogenated organic (co)polymers, in particular from among fluorinated organic (co)polymers. For the purposes of the present invention, halogenated or fluorinated organic (co)polymers are organic (co)polymers comprising, in copolymerized form, at least one (co)monomer which has at least one halogen atom or at least one fluorine atom per molecule, preferably at least two halogen atoms or at least two fluorine atoms per molecule.

Examples are polyvinyl chloride, polyvinylidene chloride, polytetrafluorethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chiorotrifluoroethylene copolymers and ethylene-chlorofluoroethylene copolymers.

Preferred binders (C) are polyvinyl alcohol and halogenated organic (co)polymers, for example polyvinyl chloride or polyvinylidene chloride, particularly preferably fluorinated (co)polymers such as polyvinyl fluoride and in particular polyvinylidene fluoride and polytetrafluoroethylene and also vinylidene fluoride-hexafluoropropylene copolymers (PVdF-HFP), for example having a melting range of 40-145° C.

In an embodiment of the present invention, binders (C) are selected from among organic (co)polymers which have an average molecular weight $M_w$ in the range from 50 000 to 1 000 000 g/mol, preferably up to 500 000 g/mol.

Film (D) is selected from among metal foils, in particular aluminum foils, or from among polymer films, for example polyester films, in particular polybutylene terephthalate films, with polymer films being able to be untreated or siliconized.

In an embodiment of the present invention, film (D) is selected from among metal foils having a thickness in the range from 10 to 50 μm, preferably from 20 to 35 μm, in particular from among aluminum foils having a thickness in the range from 10 to 50 μm, preferably from 20 to 35 μm.

In an embodiment of the present invention, film (D) is selected from among polymer films having a thickness in the range from 8 to 50 μm, preferably from 12 to 30 μm, in particular from among polybutylene terephthalate films having a thickness in the range from 10 to 50 μm, preferably from 20 to 35 μm.

In an embodiment of the present invention, cathode material produced according to the invention comprises:
from 60 to 98% by weight, preferably from 70 to 98% by weight, of mixed oxide (A),
from 1 to 15% by weight, preferably from 2 to 6% by weight, of carbon (B),
from 1 to 15% by weight, preferably from 2 to 6% by weight, of binder (C),
in each case based on the sum of mixed oxide (A), carbon (B) and binder (C).

The process of the invention comprises four steps (a), (b), (c) and (d) which are carried out in the order indicated. It is possible to carry out at least one step a plurality of times.

Steps (a), (b), (c) and (d) are described in detail below.

In step (a), a mixture comprising mixed oxide (A), carbon (B) and binder (C), is applied to film (D). The mixture can be a solid mixture, a paste having a solids content of 85% or more or preferably a suspension.

The corresponding suspensions comprise mixed oxide (A), carbon (B) and binder (C) together with one or more suspension media which, for the purposes of the present invention, are selected from among water and organic solvents, with preferred examples being acetone, tetrahydrofuran (THF), N-ethylpyrrolidone (NEP), N-methylpyrrolidone (NMP) and N,N-dimethylformamide (DMF), also mixtures of at least two of the abovementioned organic solvents and mixtures of water with at least one of the abovementioned solvents.

Preference is given to using a suspension having a solids content in the range from 5 to 90%, preferably from 60 to 80%, in step (a). Here, the solids content is the sum of mixed oxide (A), carbon (B) and binder (C). The suspension can, for example, have the consistency of a paste or have a dynamic viscosity in the range from 200 to 5000 mPa·s, determined at 23° C., preferably from 200 to 800 mPa·s, in each case at a shear rate of 10 Hz. The dynamic viscosity can, for example, be determined by rotational viscometry, for example by means of a Haake viscometer.

Application can be carried out as, for example, application by means of a slit nozzle or spraying on or doctor blade application, depending on the consistency of the suspension. If a solid mixture comprising mixed oxide (A), carbon (B) and binder (C), is to be applied to film (D), it can be applied, for example, by extrusion.

In an embodiment of the present invention, a mixture comprising mixed oxide (A), carbon (B) and binder (C) is applied in a thickness in the range from 30 to 500 μm, preferably in the range from 50 to 200 μm, to film (D), with the thickness being determined after carrying out step (b) in order to eliminate the influence of any solvent or mixture of solvents used.

The mixture comprising mixed oxide (A), carbon (B) and binder (C) can be applied to the film (D) over the full area of the latter or only to particular parts.

Step (a) can be carried out at various temperatures, preferably at room temperature.

If a mixture comprising mixed oxide (A), carbon (B) and binder (C) is to be applied by extrusion, pressure is applied. In other embodiments of the process of the invention, step (a) is preferably carried out without applied pressure.

In an embodiment of the present invention, mixed oxide (A), carbon (B) and binder (C) are applied to one or both sides of film (D). When a mixture comprising mixed oxide (A), carbon (B) and binder (C) is to be applied to both sides of film (D), firstly applying the mixture to one side of film (D), then carrying out step (b), then applying the mixture comprising mixed oxide (A), carbon (B) and binder (C) to the other side of film (D) and once again drying as per step (b) is carried out for example.

After step (a), drying is carried out, for example thermally or by freeze drying. Suitable temperatures for thermal drying are, for example, in the range from 25 to 150° C., preferably from 100 to 130° C.

In an embodiment of the present invention, step (b) is carried out in a drying oven, hot air drying oven or vacuum drying oven.

If step (b) is to be carried out in a vacuum drying oven, a particular amount of inert gas (e.g. 2-10 times the oven volume per hour at STP) can be continually fed in at a working pressure of, for example, 100 mbar in order to displace the solvent vapors from the atmosphere.

Preference is given to using a drying tunnel.

In an embodiment of the present invention, step (b) is carried out over a period in the range from one minute to 2 days, preferably from one to 24 hours. The higher the temperature, the shorter the minimum duration of step (b). If step (b) is to be carried out in a drying tunnel, the preferred residence time is in the range from 5 to 30 minutes, preferably from 10 to 20 minutes.

A blank is obtained.

In step (c), the blank is compacted so that the cathode material has a density of at least 1.8 g/cm$^3$, preferably at least 2.0 g/cm$^3$. As upper limit to the density of the cathode material, it is possible to select, for example, 3.9 g/cm$^3$, preferably 3.8 g/cm$^3$. The density is determined by determining the mass of the cathode material which can be removed from film (D) by means of a suitable solvent. Here, binder (C) is at least partly dissolved and the remaining solid constituents are converted into a slurry. Furthermore, the volume of the cathode material is determined by measuring the difference between the thickness of the cathode and the thickness of the film (D) and the area of the cathode.

For compaction, it is possible to select discontinuously or preferably continuously operating apparatuses. Examples of discontinuously operating apparatuses are presses. Examples of continuously operating apparatuses are, in particular, calenders. Furthermore, laminating machines are possible, particularly when the mixture is firstly applied to a polymer film and then laminated onto metal foil, with compaction also taking place at the same time.

If step (c) is carried out using a calender, it is possible to work at, for example, a pressing pressure ("line pressure") of the rollers in the range from 100 to 500 N/mm, preferably from 110 to 150 N/mm.

If step (c) is carried out using a press, it is possible to work at, for example, a pressure of from 100 to 1000 MPa, preferably 100-500 MPa.

In an embodiment of the present invention, step (c) is carried out at a temperature in the range from 15 to 95° C., preferably from 20 to 35° C.

The residence time of the blank in step (c) can, for example, be controlled by the intake speed of the blank. Suitable speeds are, for example, from 0.1 to 1 m/min or from 5 to 10 m/min.

As a result of step (c) being carried out, a compacted blank is obtained.

After step (c) has been carried out, step (d) is carried out. For this purpose, a thermal treatment is preferably carried out at a temperature in the range from 35° C. below the melting point of binder (C) to a maximum of 5° C. below the melting point of binder (C). If binder (C) does not have a sharp melting point, the softening point, also known as softening temperature, is selected instead of the melting point. For the purposes of the present invention, the softening point is the temperature at which amorphous or partially crystalline binder (C) goes over from the vitreous, hard-elastic state into a soft state. In a preferred variant, the Vicat softening temperature of noncurable plastics (DIN EN ISO 306: 2004-10) is selected.

In the case of binders (C) which have two softening temperatures or melting points, what has been said above applies in each case to the lower softening temperature or the lower melting point.

The melting point of binder (C) can, for example, be determined in accordance with DIN 11357. Thus, a melting point of 175° C. is obtained for polyvinylidene fluoride.

In a preferred embodiment of the present invention, the treatment in step (d) is carried out at a temperature in the range from 25° C. below to 5° C. below the melting point or the softening point of binder (C).

In an embodiment of the present invention, the treatment in step (d) is carried out within a temperature range such that a maximum temperature of 25° C. above the melting point, preferably 5° C. below the melting point, of binder (C) is not exceeded.

No pressure is applied for carrying out step (d).

To carry out this step, the compacted blank from step (c) can, for example, be stored stationary in a vessel selected, for example, from among drying ovens and convection ovens, or by moving the compacted blank, for example in a tunnel oven, with the use of tunnel ovens being preferred.

In an embodiment of the present invention, namely in the case of the use of a drying oven or a convection oven, the treatment in step (d) is carried out over a period of from 2 minutes to 2 days, preferably from 12 hours to one day.

If step (d) is to be carried out in a tunnel oven, residence times in the range from 10 to 30 minutes are preferred.

In embodiments in which the compacted blank is moved during step (d), the temperature in the oven can be significantly higher than the temperature attained in the compacted blank since the treatment is not necessarily carried out in thermal equilibrium.

As a result of step (d) being carried out, the density of the cathode material preferably does not change or does not change significantly; for example, the density changes by not more than 10%. As a result of step (d) being carried out, the density preferably increases by not more than 10%, particularly preferably not more than 5%. In another variant of the present invention, the density increases by a maximum of 0.3 g/cm$^3$, preferably a maximum of 0.2 g/cm$^3$. In another embodiment of the present invention, the density of the cathode material decreases by from 0.1 to 0.2 g/cm$^3$. The change in the density can in each case be checked at room temperature.

In one variant, it is possible to use the porosity, which can be determined by forming the difference between the cathode density and the theoretical density of the individual constituents, instead of the density of the cathode material.

Performing steps (a) to (d) gives cathodes produced according to the invention.

After steps (a) to (d) have been carried out, one or more finishing steps can be carried out, for example stamping out or cutting, in order to produce cathodes having the desired geometry. If only a small number of cathodes are to be produced by the process of the invention, the finishing step(s) can also be carried out earlier, for example before step (a).

In a particular embodiment of the present invention, film (D) for step (a) is selected from among polymer films and, after compaction as per (c) and before step (d), the compacted blank is relaminated, preferably onto a metal foil. For this purpose, a film (D) selected from among metal foils is placed on the compacted blank and the two are allowed to run through a laminator. For the purposes of the present invention, laminators comprise essentially two metal bands which are heated and can be pressed together by the force of springs or hydraulically. At the outlet of the laminator, the polymer film is then pulled off at a steep angle, the metal foil continues to run further and the coating comprising mixed oxide (A), carbon (B) and binder (C) then adheres to the metal foil. In a specific embodiment, treated polymer films, silanized or treated with fluoropolymers, are used as film (D) and relamination onto metal foil (D) is carried out after step (c).

The geometry of cathodes produced according to the invention can be selected within wide limits. Preference is given to making cathodes produced according to the invention as thin films, for example films having a thickness in the range from 40 µm to 250 µm, preferably from 45 to 130 µm. The thickness is preferably the sum of the thickness of the film (D) and twice the diameter of the largest particles of mixed oxide (A).

Preference is given to the thickness of each layer of the cathode material after conclusion of the process of the invention being at least twice the average diameter of the particles of mixed oxide (A).

Cathodes produced according to the invention can, for example, have a strip shape or preferably a circular shape.

When cathodes produced according to the invention are installed in electrochemical cells, electrochemical cells which have an improved capacity and an increased power load capability are obtained. Without wishing to favor a particular theory, polarization measurements indicate that particularly good contact between the active materials of the cathode, i.e. the mixed oxide (A), and film (D) is established in cathodes produced according to the invention and that a situation where relatively large proportions of mixed oxide (A) are completely surrounded and electrically insulated by binder (C) and are not in contact with film (D) can be successfully avoided.

The invention is illustrated by working examples.

General preliminary remarks:

To determine the cathode density (reported in g/cm$^3$), round parts, referred to as rounds, having a circle diameter of 19.8 mm (3.079 cm$^2$ cathode area) were stamped out of the cathode coated on one side and weighed.

The coating was completely removed from one round by means of N-methylpyrrolidone. As reference, film (D.1) was stamped out in the form of rounds having the same diameter and weighed.

The specific cathode loading is given by the average of the masses of the coated rounds corrected by the mass (average) of the rounds, normalized to an area of 1 cm².

In addition, the thickness of the coated rounds and the rounds was determined using a micrometer (geometry: flat surface against ball, radius 1.5 mm, measurement force about 0.5 N). The thickness of the cathode material is then given by the difference.

The density of the cathode is then given by the specific cathode loading divided by the thickness of the cathode material.

The density of the cathode can also be determined analogously on cathodes coated on both sides.

I. Production of Cathodes by the Process of the Invention and of Comparative Cathodes A lithium-nickel-manganese spinel electrode produced as follows was used. The following components:
(C.1) 155.4 g of a 10% strength by weight solution of copolymer of vinylidene fluoride and hexafluoropropylene in NMP, commercially available as Kynar Flex® 2801 from Arkema Group, melting range: 140-145° C. 163.5 g of NMP,
(B.1) 14.0% of carbon black, BET surface area of 62 m²/g, commercially available as "Super P Li" from Timcal, and
(B.2) 7.0 g of graphite, commercially available as KS6 from Timcal, were intimately mixed with one another (IKA Turrax high-speed stirrer). A suspension was obtained. 55.1 g of the suspension were taken and
(A.1) 31.9 g of $Li_{1.167}(Ni_{0.21}Co_{0.12}Mn_{0.67})_{0.833}O_2$ were added thereto. This gave a suspension of cathode material (Susp-K.1).

I.1 Step (a.1)

(Susp-K.1) was applied by means of a doctor blade to one side of an aluminum foil (D.1) having a thickness of 30 μm. Doctor blade speed: 5 mm/s, slit width of the doctor blade: 120 μm. This gave a film (D.1) coated on one side.

I.2 Step (b.1) or (b.2)

The film (D.1) which had been coated on one side from I.1 was dried for 18 hours in a drying oven, temperature as shown in Table 1. Blanks were obtained.

I.3 Step (c.1)

The blanks from 1.2 were calendered by means of a calender, line pressure of the rollers: 140 N/mm, temperature of the rollers: 23° C. The density of the electrode material was 2.1 g/cm³.

I.4 Step (d.1) or (C-d.2)

The calendered blanks from I.3 were subjected to thermal treatment in a drying oven for 18 hours at a temperature as shown in Table 1.

TABLE 1

Temperature conditions for selected steps

| | (b.1) [° C.] | (d.1) [° C.] | (C-d.2) [° C.] |
|---|---|---|---|
| Cat. 1 | 105 | 130 | — |
| Cat. 2 | 130 | 130 | — |
| C-Cat. 3 | 105 | — | 105 |
| C-Cat. 4 | 130 | — | 105 |

In no case was a density change observed during step (d.1) (measurement limit: 0.1 kg/l; density of the electrode composition was 2.1 kg/l).

II. Testing of Cathodes Produced According to the Invention and of Comparative Cathodes II.1 Production of Electrochemical Cells Circular parts of the aluminum foil which had been coated in this way were stamped out (diameter 19.8 mm). The cathodes Cat.1 and Cat.2 or comparative cathodes C-Cat.3 and C-Cat.4 which could be obtained in this way were used to produce electrochemical cells EC.1 and EC.2 produced according to the invention or comparative cells C-EC.3 and C-EC.4.

As electrolyte, use was made of a 1 mol/l solution of $LiPF_6$ in ethylene carbonate/dimethyl carbonate (1:1 by mass). The anode comprised a lithium foil which was separated from the cathode by a separator made of fiberglass paper.

A set-up as shown in FIG. 1 was used as test cell. In assembling the cell, this was put together from the bottom upward as per the schematic FIG. 1. In FIG. 1, the anode side is at the top and the cathode side is at the bottom.

The reference symbols in FIG. 1 have the following meanings:
1, 1' Punch
2, 2' Nut
3, 3' Sealing ring—in each case double; the second, somewhat smaller sealing ring is in each case not shown here
4 Spiral spring
5 Power outlet lead made of steel
6 Housing The cathode (Cat.1) was applied to the punch of the cathode side 1'. A separator made of fiberglass, thickness of the separator: 0.5 mm, was subsequently placed on the cathode (Cat.1). The electrolyte was dribbled onto the separator. The anode was placed on the impregnated separators. A small stainless plate which was placed directly on the anode was used as power outlet lead 5. The seals 3 and 3' were subsequently added and the constituents of the test cell were screwed together. Electrical contact was ensured by means of the steel spring configured as spiral spring 4 and by the pressure generated by screwing on the anode punch 1.

II.2 Test Results

The test cell was cycled according to the following program:
1$^{st}$ cycle: charging with 0.0667 C to 4.7 V, discharging of 0.0667 C to 2.0 V
2$^{nd}$ cycle: charging with 0.1 C to 4.6 V, discharging of 0.1 C to 2.0 V
3$^{rd}$ cycle: charging with 0.1 C to 4.6 V, discharging of 0.1 C to 2.0 V
4$^{th}$ cycle: charging with 0.333 C to 4.6 V, discharging of 0.333 C to 2.0 V
5$^{th}$ cycle: charging with 0.333 C to 4.6 V, discharging of 0.333 C to 2.0 V
6$^{th}$ cycle: charging with 0.333 C to 4.6 V, discharging of 0.333 C to 2.0 V
7$^{th}$ cycle: charging with 0.8 C to 4.6 V, discharging of 0.8 C to 2.0 V
8$^{th}$ cycle: charging with 0.8 C to 4.6 V, discharging of 0.8 C to 2.0 V
9$^{th}$ cycle: charging with 0.8 C to 4.6 V, discharging of 0.8 C to 2.0 V
10$^{th}$ cycle: charging with 0.8 C to 4.6 V, discharging of 1 C to 2.0 V
11$^{th}$ cycle: charging with 0.8 C to 4.6 V, discharging of 1 C to 2.0 V $12^{th}$ cycle: charging with 0.8 C to 4.6 V, discharging of 1 C to 2.0 V Each charging step was followed by a constant voltage step at the switch-off voltage (4.7 V for cycle 1, then 4.6 V). Duration: 30 min.

The results of the capacity determinations in the $1^{st}$ cycle, the $3^{rd}$ cycle, the $6^{th}$ cycle, the $9^{th}$ cycle and the $12^{th}$ cycle are shown in Table 2.

TABLE 2

Capacity measurements on cathodes according to the invention and comparative cathodes

|  | Cycle 1 | Cycle 3 | Cycle 6 | Cycle 9 | Cycle 12 |
| --- | --- | --- | --- | --- | --- |
| Cat. 1 | 310.5 | 279.6 | 265.8 | 249.7 | 242.4 |
| Cat. 2 | 306.1 | 277.3 | 264.1 | 247.9 | 240.5 |
| C-Cat. 3 | 299.1 | 271.5 | 254.1 | 230.4 | 220.9 |
| C-Cat. 4 | 296.5 | 270.0 | 254.0 | 233.3 | 225.1 |

All capacities in A·h/kg.

The invention claimed is:

1. A process for producing a cathode comprising a cathode material comprising:
   (A) a lithiated transition metal mixed oxide;
   (B) carbon in an electrically conductive modification;
   (C) a binder; and
   (D) a film, the process comprising:
   (a) applying a mixture comprising a lithiated transition metal mixed oxide (A), a carbon (B) and a binder (C) to a film (D), to form a coated film;
   (b) drying the coated film;
   (c) compacting the coated film to such an extent that a resulting cathode material on the film has a density of at least 1.8 g/cm³ to obtain a compacted blank; and
   (d) thermally treating the compacted blank either at a temperature in the range from 35° C. below a melting point of binder (C) to a maximum of 5° C. below the melting point of binder (C) or, if the binder (C) does not have a sharp melting point, at a temperature of 35° C. below a softening point of the binder (C) to a maximum of 5° C. below the softening point of binder (C);
   wherein the binder (C) is a fluorinated organic (co) polymer.

2. The process according to claim 1, wherein a density of the cathode material is changed by not more than 10% during the thermally treating (d) of the compacted blank.

3. The process according to claim 1, wherein the cathode material has a density of at least 2.0 g/cm³ after the compacting (c).

4. The process according to claim 1, wherein the cathode material has a density of not more than 3.9 g/cm³ after compacting (c).

5. The process according to claim 1, wherein no pressure is applied during the thermally treating (d).

6. The process according to claim 1, wherein the mixture is applied to one or both sides of the film (D) during the applying (a).

7. The process according to claim 1, wherein the thermally treating (d) occurs at a temperature which is in a range from 25° C. below to 5° C. below the melting point or the softening point of the binder (C).

8. The process according to claim 1, wherein the lithiated transition metal mixed oxide (A) is a lithiated Mn-comprising spinel.

9. The process according to claim 1, wherein the lithiated transition metal mixed oxide (A) comprises a lithiated sheet oxide comprising manganese and at least one further transition metal selected from the group consisting of cobalt and nickel.

10. The process according to claim 1, wherein the lithiated transition metal mixed oxide (A) is a lithiated sheet oxide comprising at least 35 mol % of manganese, based on a total content of transition metals.

11. The process according to claim 1, wherein the film (D) is a polymer film and the compacted blank is relaminated after the compacting (c) and before the thermally treating (d).

12. The process according to claim 11, wherein the compacted blank is relaminated onto a metal foil.

* * * * *